United States Patent
Wang

[19]

[11] Patent Number: 6,164,813
[45] Date of Patent: Dec. 26, 2000

[54] STATIC FLUID MIXING DEVICE WITH HELICALLY TWISTED ELEMENTS

[76] Inventor: Chiang-Ming Wang, No. 127, Min-Sheng Rd., Special Industrial Zone In Ta Yuan Hsiang, Taoyuan Hsien, Taiwan

[21] Appl. No.: 09/496,950

[22] Filed: Feb. 3, 2000

[30] Foreign Application Priority Data

Feb. 5, 1999 [TW] Taiwan ............................... 088201970

[51] Int. Cl.⁷ ...................................................... B01F 5/06
[52] U.S. Cl. ............................................................ 366/339
[58] Field of Search ................................. 366/181.5, 336, 366/338, 339; 138/37, 39; 48/189.4

[56] References Cited

U.S. PATENT DOCUMENTS

| | | |
|---|---|---|
| 1,809,350 | 6/1931 | Nichols . |
| 3,953,002 | 4/1976 | England, Jr. et al. . |
| 4,408,893 | 10/1983 | Rice, III ................................. 366/339 |
| 4,850,705 | 7/1989 | Horner ................................... 366/338 |
| 5,312,185 | 5/1994 | Kojima et al. ............................ 138/37 |

FOREIGN PATENT DOCUMENTS

| | | | |
|---|---|---|---|
| 2127316 | 4/1984 | United Kingdom | ................... 366/339 |
| 2249969 | 5/1992 | United Kingdom | ................... 366/339 |

*Primary Examiner*—Charles E. Cooley
*Attorney, Agent, or Firm*—Finnegan, Henderson, Farabow, Garrett & Dunner, L.L.P.

[57] ABSTRACT

A fluid mixing device includes a plurality of axially extending blades disposed at intervals along an angular direction. Each of the blades includes a plurality of helically twisted guide sections and a plurality of impact bearing sections connected to and spaced apart axially by the twisted guide sections. The impact bearing sections of each of the blades are aligned circumferentially with the twisted guide sections of an adjacent one of the blades. Each of the twisted guide sections has a twisted surface. The impact bearing sections of each of the blades have flat surfaces which face the twisted surfaces of the adjacent one of the blades along a circumferential direction.

12 Claims, 4 Drawing Sheets

STATIC FLUID MIXING DEVICE WITH HELICALLY TWISTED ELEMENTS

BACKGROUND OF THE INVENTION

1. Field of the invention

This invention relates to a fluid mixing device, more particularly to a fluid mixing device that is capable of uniformly mixing a liquid and air for increasing the content of oxygen dissolved in the liquid.

2. Description of the Related Art

Industrial waste water is required, according to the provisions of Environmental law, to be analyzed for the content of certain substances, such as chemical oxygen demand (COD), biochemical oxygen demand (BOD), and suspended particles contained in the waste water before discharge. To increase the content of oxygen dissolved in waste water, one of the commonly used methods is to utilize an agitator to agitate the waste water and air to form an emulsion. A motor is generally utilized for rotating the agitator described above so as to mix the waste water and air together in a container. While the agitator described above can increase the content of oxygen dissolved in waste water, a significant amount of energy, such as electrical power, is required for rotating the agitator.

SUMMARY OF THE INVENTION

Therefore, it is an object of the present invention to provide a fluid mixing device for mixing different fluids that dispenses with the use of a motor or power driving means.

Accordingly, a fluid mixing device of the present invention comprises: a shaft and a plurality of axially extending blades disposed at intervals along an angular direction of said shaft, each of the blades including a plurality of helically twisted guide sections and a plurality of impact bearing sections connected to and spaced apart axially by the twisted guide sections, the impact bearing sections of each of the blades being aligned circumferentially with the twisted guide sections of an adjacent one of the blades, each of the twisted guide sections having a twisted surface, the impact bearing sections of each of the blades being flat and having flat surfaces which face the twisted surfaces of the adjacent one of the blades along a circumferential direction, so that the twisted surfaces are capable of guiding a fluid to flow toward and to impact on the flat surfaces.

BRIEF DESCRIPTION OF THE DRAWINGS

In drawings which illustrate an embodiment of the invention.

DETAILED DESCRIPTION OF THE PREFERRED EMBODIMENT

Figure 1:
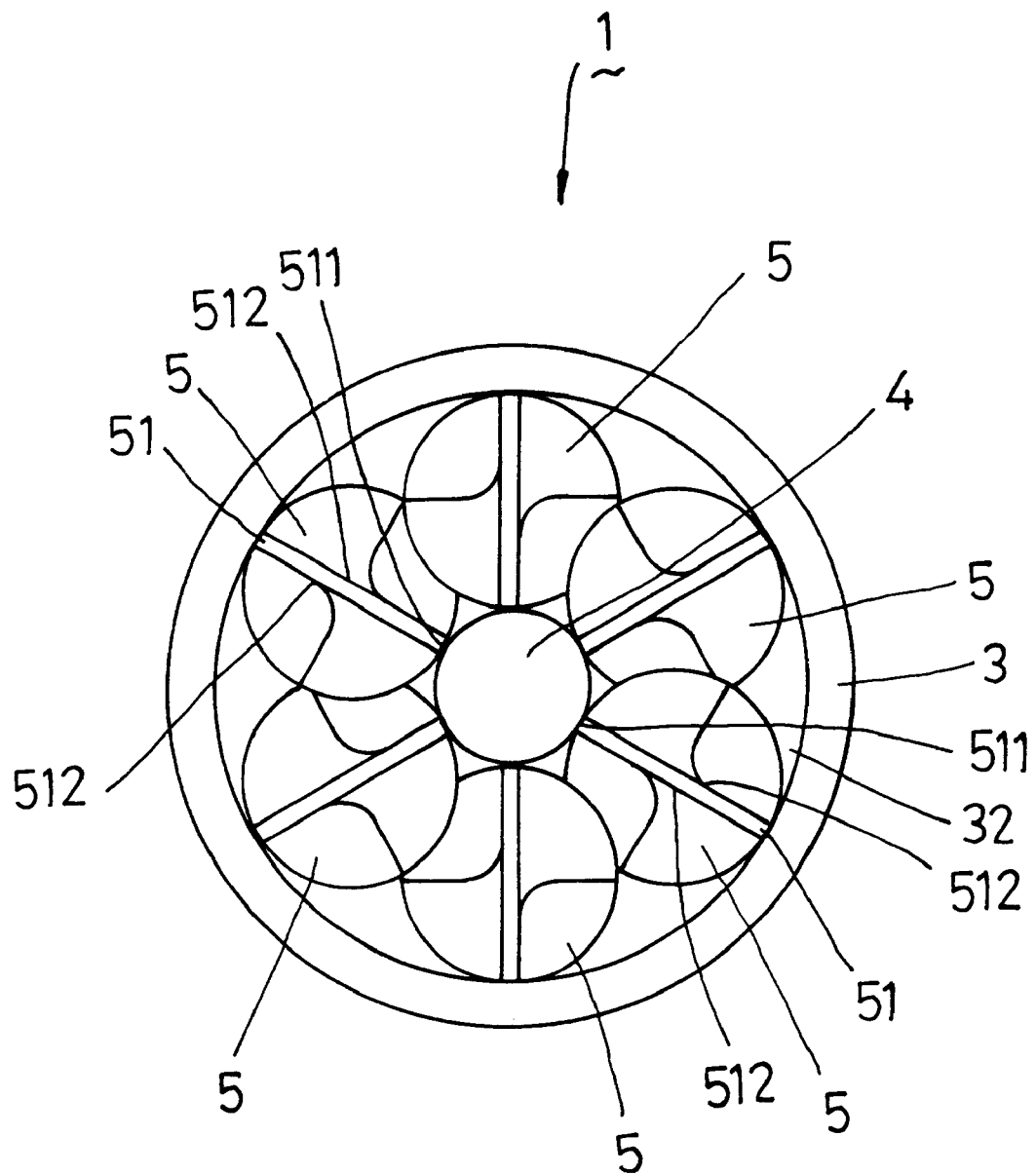
FIG. 1 is a top view illustrating a fluid mixing device embodying this invention.
Figure 2:
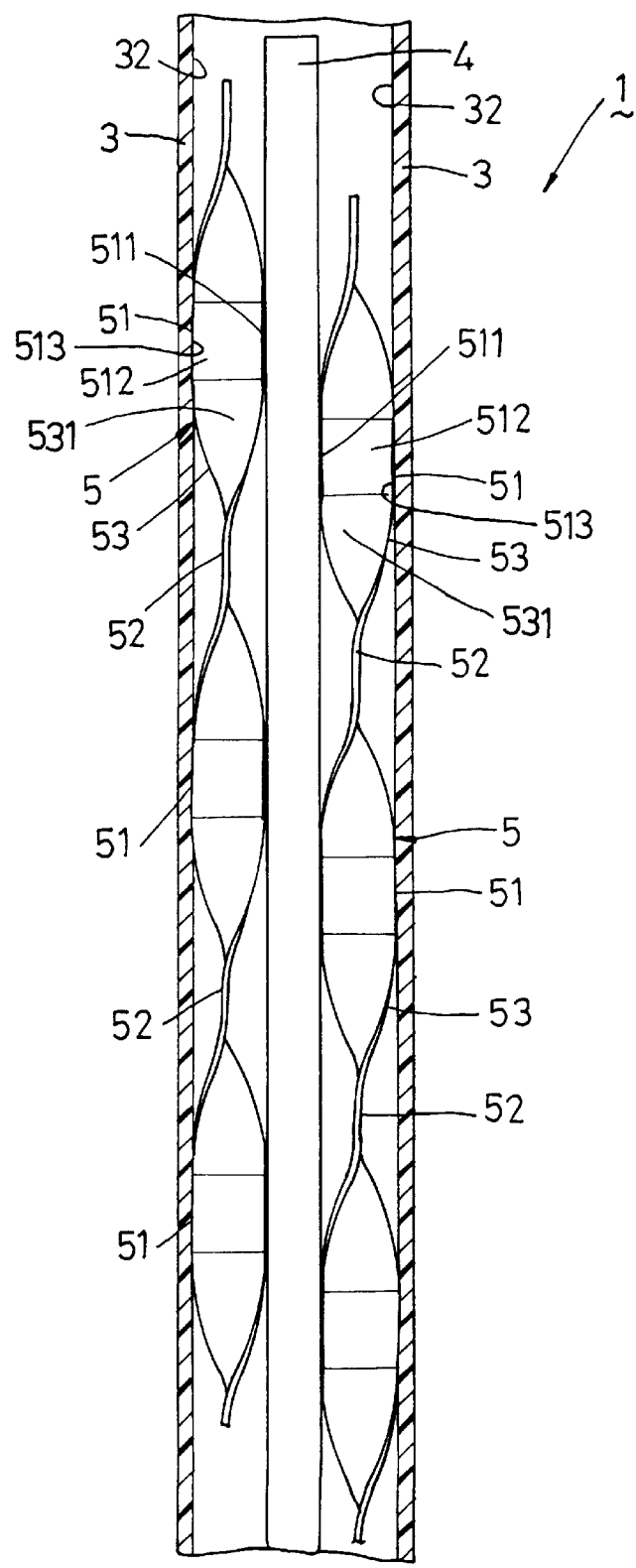
FIG. 2 is a cross-sectional side view of the fluid mixing device of FIG. 1.
Figure 3:
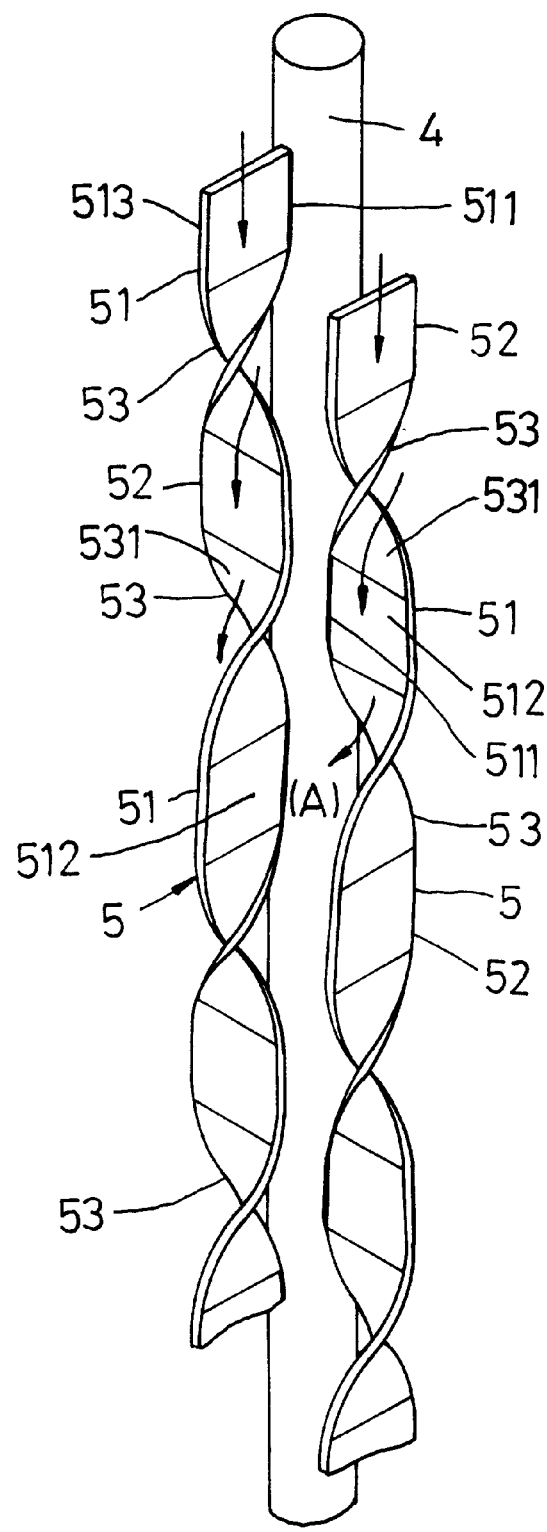
FIG. 3 is a perspective view of the fluid mixing device of FIG. 1 with only two blades shown for the sake of clarity.

FIGS. 1 to 3 illustrate a fluid mixing device 1 embodying the present invention. The fluid mixing device 1 includes a pipe 3, a shaft 4 disposed axially at the center of the pipe 3, and six elongated blades 5 axially disposed inside the pipe 3 and equiangularly distributed in a circumferential direction between the pipe 3 and the shaft 4. It should be noted here that in order to simplify the drawing, FIGS. 2 and 3 only show the relative positions of two adjacent blades 5.

Each blade 5 includes a plurality of helically twisted guide sections 53. Each twisted guide section 53 has two opposite ends connected respectively to an impact bearing section 51 and a chordal section 52. Each twisted guide section 53 has two opposite twisted surfaces 531. Each impact bearing section 51 projects radially from the shaft 4, has two opposite flat surfaces 512 and two opposite side ends 511, 513 connected respectively to the shaft 4 and the wall 32 of the pipe 3, and is flat and rectangular in shape. Each chordal section 52 extends axially and chordally relative to the shaft 4, and lies in a plane perpendicular to the flat surface 512 of the impact bearing section 51. The chordal sections 52 have the same dimension and length as the impact bearing sections 51. The length of each twisted guide section 53 is twice that of the impact bearing section 51.

The impact bearing sections 51 of each blade 5 are aligned circumferentially with the middle position of the twisted guide sections 53 of an adjacent one of the blades 5. Each flat surface 512 of the impact bearing sections 51 of each blade 5 faces the twisted surface 531 of the adjacent twisted guide section 53 of the adjacent one of the blades 5 along a circumferential direction, so that the twisted surfaces 531 can guide a fluid to flow toward and to impact on the flat surfaces 512. The arrangement of the shaft 4 and the blades 5 permit waste water and air to flow between the blades 5.

Figure 4:
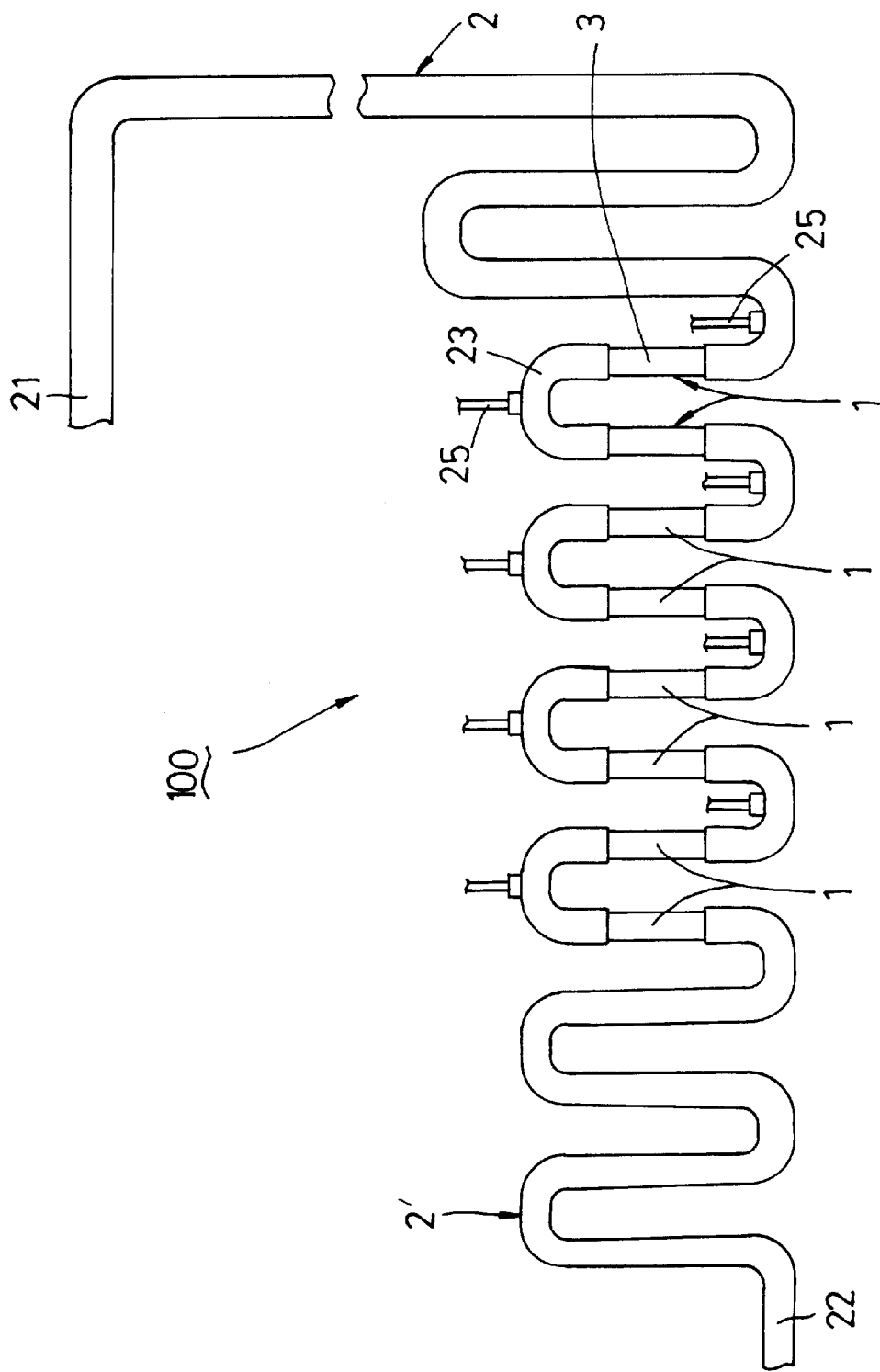
FIG. 4 shows a waste treatment unit incorporating a series of the fluid mixing devices of FIG. 1.

FIG. 4 illustrates a waste water treatment unit 100 containing a series of interconnected fluid mixing devices 1 of FIG. 1. The waste water treatment unit 100 includes an upstream pipe 2 with a fluid inlet 21, a downstream pipe 2' with a fluid outlet 22 having a height less than that of the fluid inlet 21, and a plurality of U-shaped pipes 23 connected in series to a plurality of the fluid mixing devices 1. Each U-shaped pipe 23 is also connected to an air supply pipe line 25.

In operation, water enters the fluid inlet 21, and flows toward the fluid outlet 22 due to the difference in height between the fluid inlet and outlet 21, 22. Air is sucked into the U-shaped pipes 23 when the water flows through the air supply pipe lines 25. Inside the fluid mixing devices 1, the water is guided by each twisted surface 531 of the twisted guide sections 53 of each blade 5 to form a helical movement (indicated as reference character (A) in FIG. 3) and to flow toward the corresponding flat surface 512 of the impact bearing section 51 of the adjacent one of the blades 5. Such helical movement (A) of the water drives both the water and the air to flow toward and to impact on the flat surface 512 so as to effectively mix the water and the air together, thereby increasing the content of oxygen dissolved in the water. With the waste water treatment unit 100, the effluent discharged therefrom can meet the standard discharging levels for the COD and BOD as regulated in the Environmental law for waste water treatment.

The number of the blades 5 used in the invention is not limited to six. Any even number of the blades 5 is suitable for the present invention. The blades 5 are immobile relative to the pipe 3, and no power driving means is needed to drive the blade 5 in the present invention.

The waste water treatment unit 100 may further include a pump to transport and to control the flow rate of the water in order to manage the extent of mixing of water and air. Besides, ozone can be injected into the water treatment unit 100 for the treatment of VOC (volatile organic compound) contained in the water. The waste water treatment unit 100 can be applied not only for the treatment of industrial waste water, but also for the treatment of the circulating water in a cultivation pond site, and for the treatment of tap water or drinking water to reduce the content of chlorine.

With the invention thus explained, it is apparent that various modifications and variations can be made without departing from the spirit of the present invention. It is therefore intended that the invention be limited only as recited in the appended claims.

I claim:

1. A fluid mixing device comprising:

a pipe and a plurality of axially extending blades disposed inside said pipe at intervals along an angular direction of said pipe, each of said blades including a plurality of helically twisted guide sections and a plurality of impact bearing sections connected to and spaced apart axially by said twisted guide sections, said impact bearing sections of each of said blades being aligned circumferentially with said twisted guide sections of an adjacent one of said blades, each of said twisted guide sections having a twisted surface, said impact bearing sections of each of said blades being flat and having flat surfaces which face said twisted surfaces of the adjacent one of said blades along a circumferential direction, so that said twisted surfaces are capable of guiding a fluid to flow toward and to impact on said flat surfaces.

2. The fluid mixing device as claimed in claim 1, further comprising a shaft disposed centrally among and connected to said blades.

3. The fluid mixing device as claimed in claim 2, wherein each of said blades further includes a plurality of chordal sections which extend axially and chordally relative to said shaft between two adjacent ones of said impact bearing sections, said impact bearing sections being connected to said chordal sections via said twisted guide sections.

4. The fluid mixing device as claimed in claim 3, wherein said impact bearing sections are rectangular and have one side end connected to said shaft.

5. The fluid mixing device as claimed in claim 4, wherein said impact bearing sections extending radially and outwardly from said shaft.

6. The fluid mixing device as claimed in claim 5, wherein said chordal sections are flat and rectangular in shape, and lie in a plane perpendicular to said impact bearing sections.

7. The fluid mixing device as claimed in claim 6, wherein said impact bearing sections and said chordal sections have the same length, said twisted guide sections having a length which is twice that of said impact bearing sections.

8. The fluid mixing device as claimed in claim 7, wherein the number of said blades is six.

9. The fluid mixing device as claimed in claim 1, wherein said blades are stationary relative to said pipe.

10. The fluid mixing device as claimed in claim 1, wherein the number of said blades is six.

11. A fluid mixing device comprising:

a shaft and a plurality of axially extending blades disposed at intervals along an angular direction of said shaft and connected to said shaft, each of said blades including a plurality of helically twisted guide sections and a plurality of impact bearing sections connected to and spaced apart axially by said twisted guide sections, said impact bearing sections of each of said blades being aligned circumferentially with said twisted guide sections of an adjacent one of said blades, each of said twisted guide sections having a twisted surface, said impact bearing sections of each of said blades being flat and having flat surfaces which face said twisted surfaces of the adjacent one of said blades along a circumferential direction, so that said twisted surfaces are capable of guiding a fluid to flow toward and to impact on said flat surfaces.

12. The fluid mixing device as claimed in claim 11, further comprising a pipe receiving said shaft and said blades.

\* \* \* \* \*